(12) United States Patent
Tanabe

(10) Patent No.: US 7,364,222 B2
(45) Date of Patent: Apr. 29, 2008

(54) WIRE COLLISION SENSOR SYSTEM

(75) Inventor: Takatoshi Tanabe, Ichinomiya (JP)

(73) Assignee: DENSO CORPORATION, Kariya (JP)

( * ) Notice: Subject to any disclaimer, the term of this patent is extended or adjusted under 35 U.S.C. 154(b) by 214 days.

(21) Appl. No.: 11/244,177

(22) Filed: Oct. 6, 2005

(65) Prior Publication Data

US 2006/0076799 A1   Apr. 13, 2006

(30) Foreign Application Priority Data

Oct. 12, 2004 (JP) .............................. 2004-297747

(51) Int. Cl.
*B60R 21/0136* (2006.01)
(52) U.S. Cl. ..................... 296/187.03; 296/187.04; 296/187.09; 296/187.11; 293/4
(58) Field of Classification Search ........... 296/187.03, 296/187.04, 18.09, 187.1, 187.11; 293/102, 293/120, 132–137, 121, 4; 180/274
See application file for complete search history.

(56) References Cited

U.S. PATENT DOCUMENTS

| | | | |
|---|---|---|---|
| 6,334,639 B1 * | 1/2002 | Vives et al. ................. 293/133 |
| 6,443,509 B1 * | 9/2002 | Levin et al. ..................... 293/4 |
| 6,516,278 B1 | 2/2003 | Ishizaki et al. |
| 6,561,301 B1 * | 5/2003 | Hayashi et al. ............. 180/274 |
| 6,929,282 B1 * | 8/2005 | Zoratti et al. ................ 280/735 |
| 6,948,750 B2 * | 9/2005 | Federspiel et al. .......... 293/109 |
| 6,997,060 B2 * | 2/2006 | Morikawa .................... 73/775 |
| 7,024,293 B2 * | 4/2006 | Ishizaki et al. ................ 701/45 |
| 7,036,621 B2 * | 5/2006 | Takafuji et al. ............. 180/274 |
| 7,059,642 B2 * | 6/2006 | Ohno et al. .................. 293/120 |
| 7,131,512 B2 * | 11/2006 | Aoki .......................... 180/271 |
| 7,226,097 B2 * | 6/2007 | Adachi et al. .............. 293/120 |
| 7,236,866 B2 * | 6/2007 | Takafuji et al. ................ 701/45 |
| 2004/0108157 A1 * | 6/2004 | Takafuji et al. ............. 180/274 |
| 2004/0129479 A1 | 7/2004 | Ozaki |
| 2005/0021192 A1 * | 1/2005 | Takafuji et al. ................. 701/1 |
| 2006/0017295 A1 * | 1/2006 | Danisch ....................... 293/120 |
| 2006/0208510 A1 * | 9/2006 | Takahashi et al. .......... 293/102 |
| 2007/0046044 A1 * | 3/2007 | Tanabe ....................... 293/120 |
| 2007/0114803 A1 * | 5/2007 | Takahashi et al. .......... 293/102 |
| 2007/0164574 A1 * | 7/2007 | Tanabe ....................... 293/102 |

* cited by examiner

*Primary Examiner*—Christopher P. Ellis
*Assistant Examiner*—Greg Blankenship
(74) *Attorney, Agent, or Firm*—Posz Law Group, PLC

(57) ABSTRACT

A wire collision sensor system for a vehicle, which includes a vehicle body, includes a bumper, a wire, a wire deformation sensor and a determination circuit. The bumper is mounted on a longitudinal end portion of the vehicle body. The wire, which senses a collision of the vehicle, is received in the bumper and extends along the bumper in a transverse direction of the vehicle. The wire is connected to at least one of the vehicle body and the bumper at both ends in such a manner that the wire is displaceable in a longitudinal direction of the wire. The wire deformation sensor electrically senses a physical quantity, which is associated with a deformation of the wire at a time of the collision. The wire deformation sensor transmits an output, which indicates the sensed physical quantity. The determination circuit determines a state of the collision based on the output.

11 Claims, 3 Drawing Sheets

WIRE COLLISION SENSOR SYSTEM

CROSS REFERENCE TO RELATED APPLICATION

This application is based on and incorporates herein by reference Japanese Patent Applications No. 2004-297747 filed on Oct. 12, 2004.

BACKGROUND OF THE INVENTION

1. Field of the Invention

The present invention relates to a wire collision sensor system for vehicle. The wire collision sensor system senses a vehicle collision load by use of a wire.

2. Description of Related Art

Unexamined Japanese Patent Publication No. 2004-212281, which corresponds to US 2004/0129479 A1, discloses the wire collision sensor system, which senses an increase of a tensile force of a wire at a time of a vehicle collision. The wire is horizontally spanned along a front side of a bumper reinforcement at a predetermined level of the tensile force.

An invention according to the Unexamined Japanese Patent Publication No. 2004-212281 measures a tensile force variation, which is caused by deformation of the bumper reinforcement at the time of the vehicle collision, by use of tensile force sensors that are connected with corresponding ends of the wire. In a case where the invention measures a collision of a collision body with a small mass (e.g., a pedestrian), the deformation of the bumper reinforcement at the time of the vehicle collision is small. Thus, this may cause a disadvantage, such as deterioration of a degree of sensing accuracy. Also, there may be a disadvantage of sensing latency. The collision body collides with the bumper, and a collision load is transmitted from the bumper to the bumper reinforcement. Then, the bumper reinforcement is deformed. The collision or the collision load are not sensed until the wire tensile force is changed as a result of the deformation of the bumper reinforcement. Likewise, the sensing latency occurs.

SUMMARY OF THE INVENTION

The present invention addresses the above disadvantages. Thus, it is an objective of the present invention to provide a wire collision sensor system, which effectively senses a collision or a collision load of a collision body.

To achieve the objective of the present invention, there is provided a wire collision sensor system for a vehicle, which includes a vehicle body. The wire collision sensor system includes a bumper, a wire, a wire deformation sensor and a determination circuit. The bumper is mounted on a longitudinal end portion of the vehicle body. The wire senses a collision of the vehicle, and is received in the bumper. The wire extends along the bumper in a transverse direction of the vehicle. The wire is connected to at least one of the vehicle body and the bumper at both ends in such a manner that the wire is displaceable in a longitudinal direction of the wire. The wire deformation sensor electrically senses a physical quantity, which is associated with a deformation of the wire at a time of the collision. The wire deformation sensor transmits an output, which indicates the sensed physical quantity. The determination circuit determines a state of the collision based on the output, which is transmitted by the wire deformation sensor.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

First Embodiment

Figure 1:
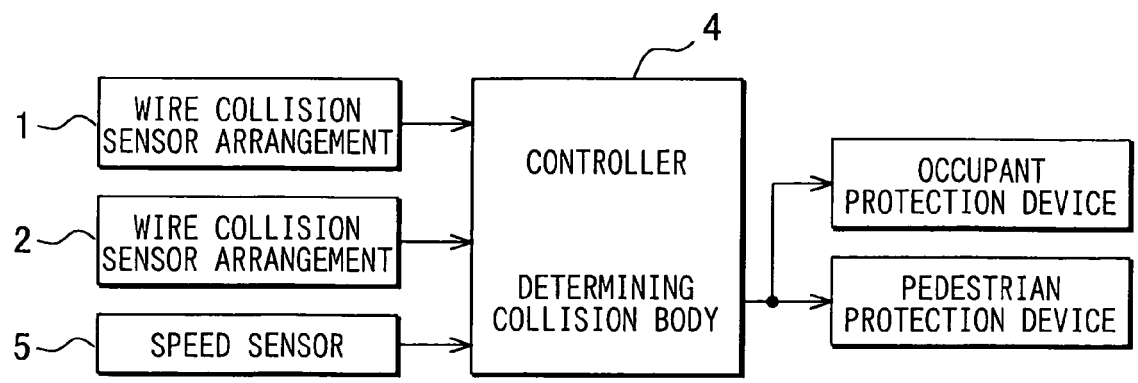
FIG. 1 is a block diagram showing a wire collision sensor system for a vehicle according to a first embodiment of the present invention.
Figure 2:
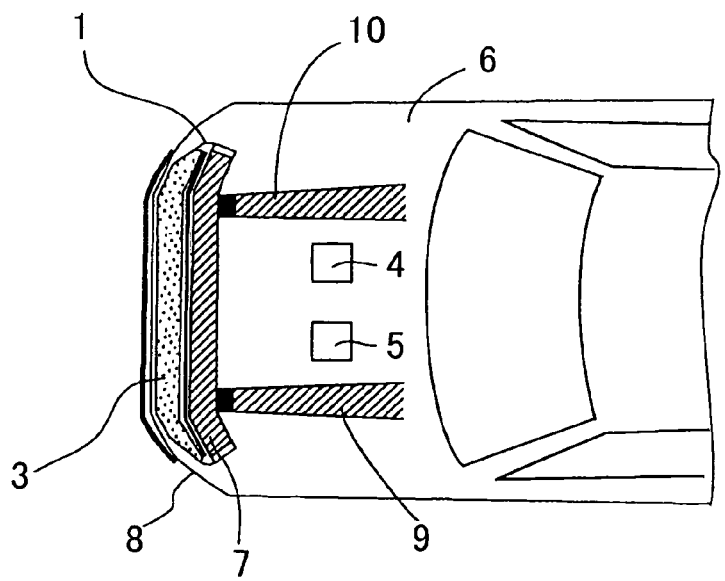
FIG. 2 is a schematic plan view of the wire collision sensor system for the vehicle according to the first embodiment of the present invention.

A wire collision sensor system for a vehicle of a first embodiment will be described with reference to a block diagram shown in FIG. 1 and a schematic plan view shown in FIG. 2. A front direction according to the present embodiment is a driving direction of the vehicle. A widthwise direction according to the present embodiment is a transverse direction of the vehicle.

Numerals 1 and 2 are wire collision sensor arrangements, a numeral 3 is a bumper absorber, a numeral 4 is a controller (a signal processing unit), a numeral 5 is a speed sensor, a numeral 6 is a vehicle body, a numeral 7 is a bumper reinforcement, a numeral 8 is a bumper cover and numerals 9 and 10 are side members. The side members 9, 10 are structural members, which are arranged at a predetermined interval at a bottom part of the vehicle and extend in a longitudinal direction of the vehicle. The bumper reinforcement 7 is a structural member, which is fixed horizontally with front ends of the side members 9, 10. The bumper absorber 3 is fixed with a front surface of the bumper reinforcement 7. The bumper cover 8 covers the bumper reinforcement 7, and is fixed with either the bumper absorber 3 or the bumper reinforcement 7. A bumper according to the present invention includes the bumper absorber 3 and the bumper cover 8.

Figure 3:
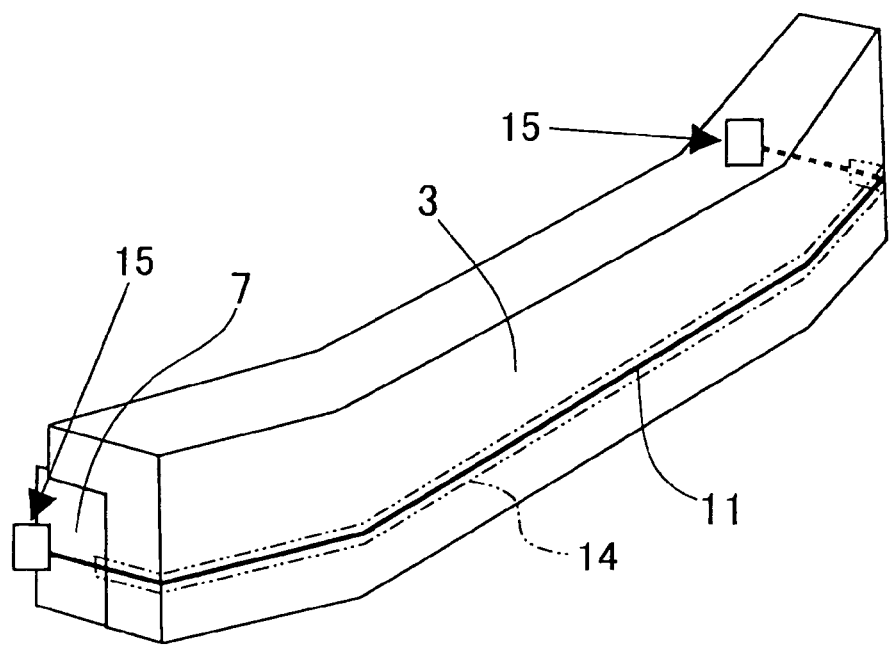
FIG. 3 is a schematic perspective view of the wire collision sensor system for the vehicle according to the first embodiment of the present invention.
Figure 4:
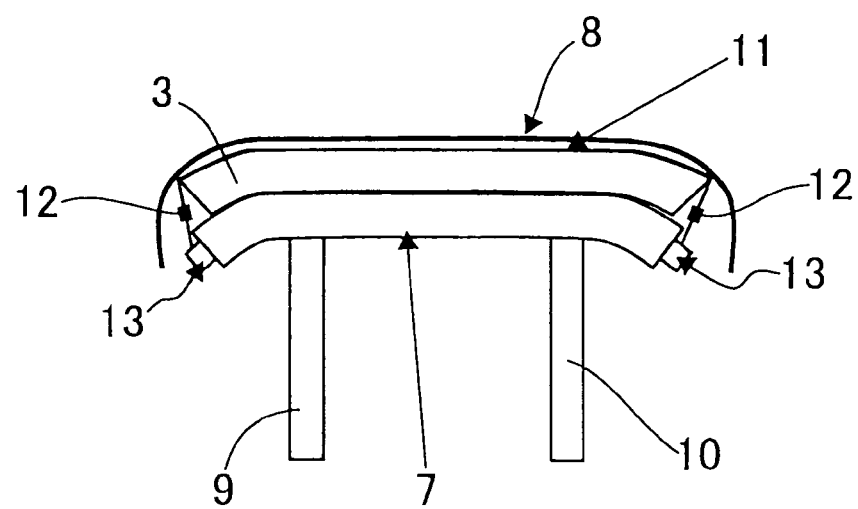
FIG. 4 is a schematic enlarged plan view of the wire collision sensor system for the vehicle according to the first embodiment of the present invention.
Figure 5:
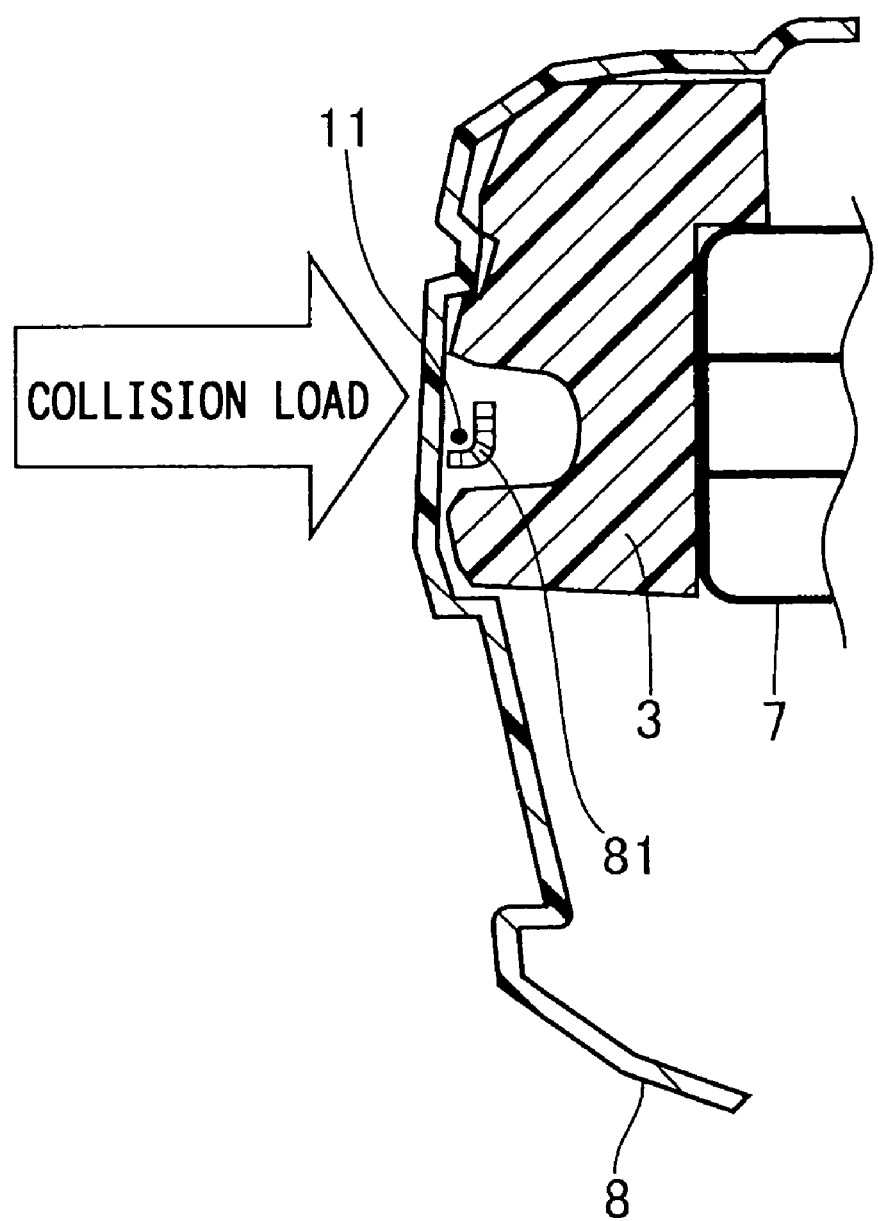
FIG. 5 is a schematic longitudinal sectional view of the wire collision sensor system for the vehicle according to a second embodiment of the present invention.

The wire collision sensor arrangements 1, 2 will be described with reference to FIGS. 3 and 4. The wire collision sensor arrangement 1 includes a resin thread (wire) 11 and a pair of wire sensor members 15. Each of the wire sensor members 15 is connected to a corresponding widthwise end of the bumper reinforcement 7. The resin thread 11 extends in a widthwise direction along a front surface of the bumper absorber 3, and each end of the resin thread 11 is connected with the corresponding wire sensor member 15.

Each wire sensor member 15 includes a coil spring (a slack take-up member) 12, a tensile force sensor (a wire deformation sensor) 13 and a plastic tube (a tube) 14. One end of the coil spring 12 is connected to one end of the resin thread 11. One end of the tensile force sensor 13 is connected to the other end of the coil spring 12. The other end of the tensile force sensor 13 is connected to the corresponding widthwise end of the bumper reinforcement 7. The plastic tube 14 receives the resin thread 11. Therefore, the plastic tube 14 closely contacts the front side of the bumper absorber 3, and a most part of the plastic tube 14 extends along the bumper absorber 3. The plastic tube 14 has grease (a lubricant) inside. The tensile force sensor 13 includes a general strain gage sensor.

In the present embodiment, the plastic tube 14 is received and held in a groove, which is positioned in the front surface of the bumper absorber 3 and extends in the widthwise direction thereof. Therefore, the plastic tube 14 is not vertically displaced by vibration and its own weight. Also, the plastic tube 14 may be omitted. To reduce friction during displacement of the resin thread 11, the resin thread 11 may be thinner as far as the resin thread 11 is strong enough for a use in the present invention. At widthwise corners of the bumper absorber 3, the plastic tube 14 and the resin thread 11 are sharply bent. At the widthwise corners, guide rollers or hard guide members, surfaces of which are curved, are mounted to limit the plastic tube 14 or the resin thread 11 from cutting into the bumper absorber 3. Also, the guide rollers or hard guide members limit an increase of the friction between the bumper absorber 3 and the plastic tube 14 (or the resin thread 11). Illustrational explanation is omitted because this is easily understood.

In the above-described embodiment, the coil springs 12, which are elastic members, are mounted on both ends of the resin thread 11. However, a single coil spring 12 may be mounted on only one end of the resin thread 11. Likewise, only one of the tensile force sensors 13 may be mounted on one end of the resin thread 11. The tensile force sensor 13 may be a sensor, which is different from the strain gage sensor. The tensile force sensor 13 may be a wire longitudinal directional displacement sensor, which measures a longitudinal displacement of either the resin thread 11 or the coil spring 12. The wire longitudinal directional displacement sensor includes known theories, such as a rotary-encoder method or an electromagnetically sensing method. In the rotary-encoder method, the resin thread 11 is wound around a reel and a rotary encoder, which senses a rotation angle of the reel, is installed on the reel. In the electromagnetically sensing method, movement of a magnet, which is connected with the resin thread 11 in series, is sensed. The resin thread 11 may be a fishing line. However, the wire may be a different kind of wire, such as a steel wire. A cross section of the wire may be one of various shapes, such as a circular shape, flat shape and a tape shape.

An operation of the wire collision sensor arrangement 1 will be described.

A case, where a collision body locally collides with a widthwise center portion of the bumper cover 8, will be described. In a case, where a concave is generated at the widthwise center portion of the bumper cover 8 because of the collision, the resin thread 11 is drawn inside the bumper cover 8 along the concave. As a result, the resin thread 11 on one side of the concave is drawn by a length of $\Delta L$, and the resin thread 11 on the other side of the concave is also drawn by a length of $\Delta L$. Thus, the both coil springs 12, which are positioned on the both ends of the resin thread 11, expand by almost the same amount. Therefore, both tensile force sensors 13 output almost the same signal voltages, which correspond to the tensile force that is proportional to the expanding amounts of the coil springs 12.

However, specifically, the expanding amounts of the coil springs 12 may be mutually different. This is because the front surface of the bumper absorber 3 or an inner surface of the plastic tube 14 generates friction resistance of the resin thread 11. The friction resistance of each side of the concave is proportional to a corresponding length of the resin thread 11, the corresponding length between the concave, which indicates the collision position, and the coil spring 12 of the corresponding side. Therefore, a difference between the expanding amounts of the coil springs 12 of the both sides of the resin thread 11 is proportional to a difference between the friction resistance of the one side of the resin thread 11 and that of the other side. Thus, it is possible to estimate a widthwise position of the collision by use of a difference between tensile force amounts, which are sensed by the tensile force sensors 13. For example, in a case, where the collision position is a completely widthwise center, the difference between the tensile force amounts is zero. Also in a case, where the collision position is closer to one of the widthwise ends, the tensile force sensor 13, which is closer to the collision position, senses a larger tensile force than the tensile force sensor 13 of the other side.

The bumper absorber 3 has a plastic deformation characteristic toward a collision load. Thus, a deformation amount of the bumper absorber 3 is proportional to the collision load. Also, the displacement of the resin thread 11 is proportional to the deformation amount of the bumper absorber 3. Further, the tensile force or an expanding amount of the coil spring 12 is proportional to the displacement of the resin thread 11. Therefore, a differential value of the tensile force that the tensile force sensor 13 senses (or an expanding amount of the coil spring 12 per unit time) has relation with a deformation amount of the bumper absorber 3 per unit time, a collision energy amount per unit time, and the collision load.

A case, where the collision body collides with a whole front surface of the bumper cover 8 will be described. When the collision body collides with the whole front surface of the bumper cover 8, the bumper cover 8, the resin thread 11 and the bumper absorber 3 are deformed (displaced) backward. This reduces a minimum path length, which is a minimum length for the wire collision sensor arrangement 1 to extend along the bumper absorber 3. When the minimum path length is reduced, the coil spring 12 becomes shorter and the resin thread 11 is displaced backward along with the bumper absorber 3. Thus, this reduces the tensile force, which is measured by the tensile force sensors 13. Then, the tensile force sensors 13 output signal voltages, which correspond to the reduced tensile force. This kind of collision is recognized as a head-on collision, but not as a collision with pedestrians.

A case, where the collision body collides with widthwise corner portions of the bumper cover 8 will be described. When the collision body collides with either a right or left corner portion of the bumper cover 8, the bumper cover 8 around the collision part is deformed backward in a slanting direction. This reduces the minimum path length for the wire collision sensor arrangement 1. Thus, the coil spring 12 becomes shorter and the resin thread 11 around the collision part is displaced backward along with the bumper absorber 3. This reduces the tensile force on the tensile force sensors 13. The tensile force sensors 13 output signal voltages, which correspond to the reduced tensile force. Therefore, the tensile force sensors 13 sense a backward deformation of the corner portion of the bumper absorber in the collision.

The controller 4, which serves as a determination circuit, processes the signal voltages, which indicate tensile force variations and are outputted by the tensile force sensors 13. The controller 4 identifies an occurrence of the collision in a case, when a measured tensile force exceeds a regular initial value, which is measured right before the collision, by a predetermined amount. The controller 4 estimates a mass of the collision body based on a speed change rate and the collision load, which is estimated based on the differential value of the tensile force (the tensile force variation per unit time). In a case, where the mass of the collision body stays within a pedestrian mass range, the collision body is determined to be a pedestrian.

In a case, where the tensile force increases, the controller 4 estimates a widthwise collision position by use of a difference of the measured values of the tensile forces, which are sensed by the tensile force sensors 13. Likewise, in a case, where the tensile force on one of right and left corner portions is reduced greatly, the controller 4 estimates an occurrence of the collision around the one of right and left corner portions of the bumper absorber 3.

A non-collision-state tensile force, which is sensed by the tensile force sensor 13, of the resin thread 11 or an equivalent wire is initially determined based on dimensional variation between members due to manufacturing dispersion, when the members are installed. Later on, the non-collision-state tensile force of the resin thread 11 or the equivalent wire varies, when a length of the resin thread 11 or the equivalent wire changes due to aged deterioration. In order to limit a harmful effect caused by the variation of the tensile force in an estimation of the collision load, a measured value of the tensile force, which is sensed by the tensile force sensor 13 right before a sharp change of the tensile force in the collision, is defined as a reference value of the tensile force. Then, the collision load is estimated based on the tensile force variation per unit time with reference to the reference value. This limits the harmful effect of the tensile force variations, which are caused by length variations of the wire according to the dimensional variation between the members and the aged deterioration.

Effects of the present embodiment will be described. According to the wire collision sensor arrangement 1 of the above-described embodiment, the length of each coil spring 12 flexibly changes to follow the deformation and the displacement of the bumper absorber 3 and the bumper cover 8. In other words, the wire collision sensor arrangement 1 converts the deformation and the displacement of the bumper absorber 3 and the bumper cover 8 into the variation of the path length of the resin thread 11 or the longitudinal displacement of the resin thread 11. Thus, the wire collision sensor arrangement 1 can effectively sense the collision or the collision load of the collision body with a smaller mass than the vehicle, such as the pedestrian.

The resin thread 11 is positioned between the bumper absorber 3 and the bumper cover 8. Thus, the collision load of the collision body can be transmitted to the wire immediately after the collision body collides with the bumper. Therefore, the collision or the collision load can be quickly sensed. Even in a case, where the whole bumper absorber 3 is deformed to come closer to the vehicle body (the bumper reinforcement 7) in the collision, the longitudinal displacement of the wire is changed according to the deformation of the bumper absorber 3. Thus, the collision or the collision load can be sensed without any problems.

In a case, where a length of bumper path for supporting the wire is different between bumpers due to the manufacturing dispersion, the slack take-up member takes up slack of the wire and maintains a wire extending length corresponding to the length of the bumper path for supporting the wire. Therefore, manufacturing yields can be greatly improved.

Second Embodiment

In a second embodiment, similar components of a wire collision sensor system, which are similar to the components of the wire collision sensor system of the first embodiment, will be indicated by the same numerals.

The second embodiment is characterized by supporting the resin thread 11 of the collision sensor system 1 in a back surface of the bumper cover 8. The bumper cover 8 includes projection members 81, which are arranged at predetermined intervals, and slidably support the resin thread 11. Each projection member 81 is formed into an L-shaped body, which defines a groove that opens upward. The groove supports the resin thread 11. The projection member 81 may be designed to have a hole, which supports the resin thread 11, instead of the groove. This brings an equivalent effect with the first embodiment. Also, the projection members 81, which are arranged at the predetermined intervals for slidably supporting the resin thread 11, may be supported by the bumper absorber 3. A rail shaped member, which is integrally formed with the projection members 81, may be adhesively bonded with or engaged with the back surface of the bumper cover 8 or the front surface of the bumper cover absorber 3. The projection members 81 are at least positioned at the widthwise corner portions of the bumper cover 8 so that the resin thread 11 changes a direction at the corner portions.

A modification will be described. The resin thread 11 is fixedly wound around a projection members in the widthwise center position at the back surface of the bumper cover 8. The both ends of the resin thread 11 are connected with the bumper reinforcement 7 through corresponding coil springs 12 and tensile force sensors 13. Then, the collision on a left side of the bumper cover 8 is sensed exclusively by the tensile force sensor 13 on the left side. The collision on a right side of the bumper cover 8 is sensed exclusively by the tensile force sensor 13 on the right side. The collision on the widthwise center position of the bumper cover 8 is sensed by both tensile force sensors 13. Therefore, the collision position can be accurately estimated.

Additional advantages and modifications will readily occur to those skilled in the art. The invention in its broader terms is therefore not limited to the specific details, representative apparatus, and illustrative examples shown and described.

What is claimed is:

1. A wire collision sensor system for a vehicle, which includes a vehicle body, the wire collision sensor system comprising:
   a bumper, which is mounted on a longitudinal end portion of the vehicle body;
   a wire for sensing a collision of the vehicle, wherein:
      the wire is received in the bumper;
      the wire extends along the bumper in a transverse direction of the vehicle; and
      the wire is connected to at least one of the vehicle body and the bumper at both ends in such a manner that the wire is displaceable in a longitudinal direction of the wire;
   a wire deformation sensor for electrically sensing a physical quantity, which is associated with a deformation of the wire at a time of the collision, wherein the wire deformation sensor transmits an output, which indicates the sensed physical quantity;
   a determination circuit for determining a state of the collision based on the output, which is transmitted by the wire deformation sensor; and a slack take-up member, which takes up slack of the wire, wherein:
   the slack take-up member displaces the wire in the longitudinal direction of the wire at the time of the collision;
   the physical quantity, which is sensed by the wire deformation sensor, is an amount of wire displacement in the longitudinal direction of the wire; and
   the wire deformation sensor converts the amount of wire displacement in the longitudinal direction of the wire into an electrical signal.

2. The wire collision sensor system according to claim 1, wherein:
   the vehicle body includes a bumper reinforcement on the longitudinal end portion of the vehicle body, wherein the bumper is mounted on the bumper reinforcement; and
   the bumper includes a bumper absorber and a bumper cover, which are ranged such that the bumper reinforcement the bumper absorber and the bumper cover are provided in this order in a longitudinal direction of the vehicle body;
   the bumper cover covers at least an outer surface of the bumper absorber; and
   the wire is located between the bumper absorber and the bumper cover.

3. The wire collision sensor system according to claim 2, further comprising a tube, into which the wire is inserted.

4. The wire collision sensor system according to claim 3, wherein the tube receives at least one of the following:
   a lubricant; and
   a friction coefficient reducing member, which reduces friction resistance between the wire and an inner surface of the tube.

5. The wire collision sensor system according to claim 2, further comprising a plurality of projection members, which are ranged at predetermined intervals for slidably supporting the wire, wherein the plurality of projection members is supported by the bumper cover.

6. The wire collision sensor system according to claim 2, wherein the wire is supported by the bumper absorber.

7. The wire collision sensor system according to claim 6, further comprising a plurality of projection members, which are arranged at predetermined intervals for slidably supporting the wire, wherein the plurality of projection members is supported by the bumper absorber.

8. The wire collision sensor system according to claim 1, wherein:
   the vehicle body includes a bumper reinforcement on the longitudinal end portion of the vehicle body; and
   the both ends of the wire are finally connected with the bumper reinforcement.

9. The wire collision sensor system according to claim 1, wherein the slack take-up member, which takes up the slack of the wire, includes an elastic member.

10. The wire collision sensor system according to claim 9, wherein the elastic member includes a coil spring, which is connected with the wire in series.

11. The wire collision sensor system according to claim 1, wherein the wire deformation sensor is a first wire deformation sensor for electrically sensing a corresponding physical quantity, the wire collision sensor system further comprising a second wire deportation sensor for electrically sensing a corresponding physical quantity, which is associated with a deformation of the wire at the time of the collision, wherein:
   the first and second wire deformation sensors transmit corresponding outputs, which indicate the sensed corresponding physical quantities; and
   the determination circuit for determining a state of the collision based on a difference between the corresponding outputs, which are transmitted by the first and second wire deformation sensors.

* * * * *